United States Patent [19]

Silba

[11] 4,135,596
[45] Jan. 23, 1979

[54] HOSE TRAY FOR LIQUID TRANSPORTER

[76] Inventor: Glen R. Silba, R.R. #2, Box 36, Brownsburg, Ind. 46112

[21] Appl. No.: 854,826

[22] Filed: Nov. 25, 1977

[51] Int. Cl.$^2$ .......................... B60P 3/22; B60T 7/12
[52] U.S. Cl. .................................. 180/111; 137/344; 137/355.16; 220/211; 280/5 C
[58] Field of Search ...................... 180/82 R, 111–113; 280/5 R, 5 C; 49/340; 303/6.1; 220/211; 137/344, 355.16, 355.17; 224/42.32; 222/626

[56] References Cited

U.S. PATENT DOCUMENTS

| 1,652,619 | 12/1927 | Fiss | 224/42.32 |
| 2,041,320 | 5/1936 | Bradley et al. | 280/5 C |
| 2,179,704 | 11/1939 | Schjolin | 303/6.1 |
| 2,686,497 | 8/1954 | Dooley | 49/340 X |
| 2,871,872 | 2/1959 | Rowles | 180/82 R |
| 3,026,004 | 3/1962 | Rowell | 222/626 X |

Primary Examiner—Kenneth H. Betts
Attorney, Agent, or Firm—Jenkins, Coffey & Hyland

[57] ABSTRACT

A hose tray for storing a fluid fill and drain hose for a liquid transport truck includes a cover having a closed position covering the tray to prevent access to, or accidental loss of, the hose and an open position permitting access to the hose. The tray is mounted on the vehicle adjacent, and extending longitudinally of, the liquid transport tank. The tray includes a safety interlock such that when the cover is in the open position, the truck brake system is actuated to prevent movement of the truck. This prevents movement of the truck such as would tear the hose from the truck drain fitting, causing spilling of the tank contents. This is extremely important, particularly in view of the flammable nature of many liquids transported in tank trucks, and further in view of the expense to repair torn and damaged drain hose and fittings for such trucks.

9 Claims, 5 Drawing Figures

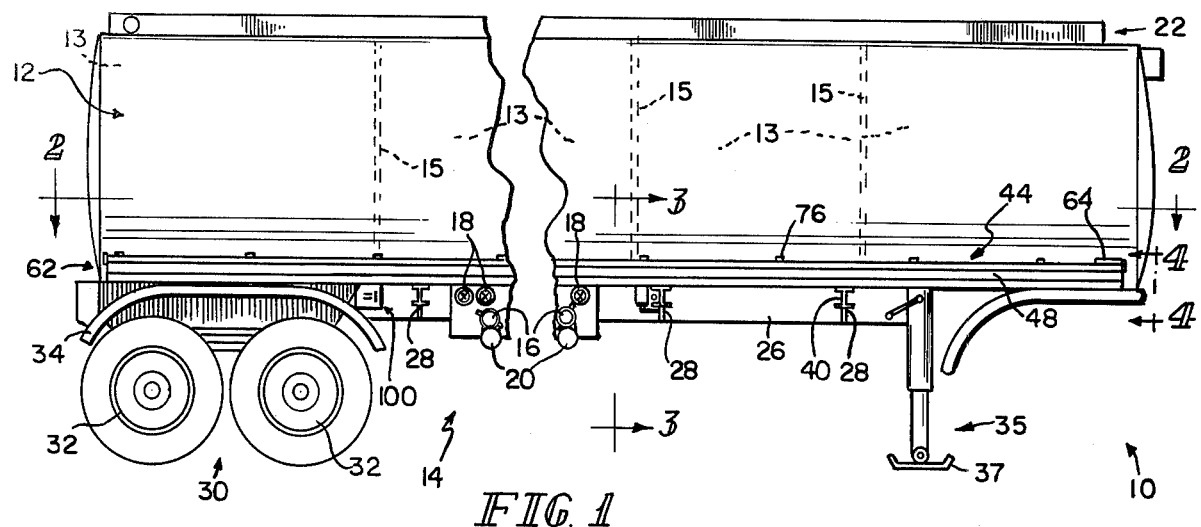
FIG. 1
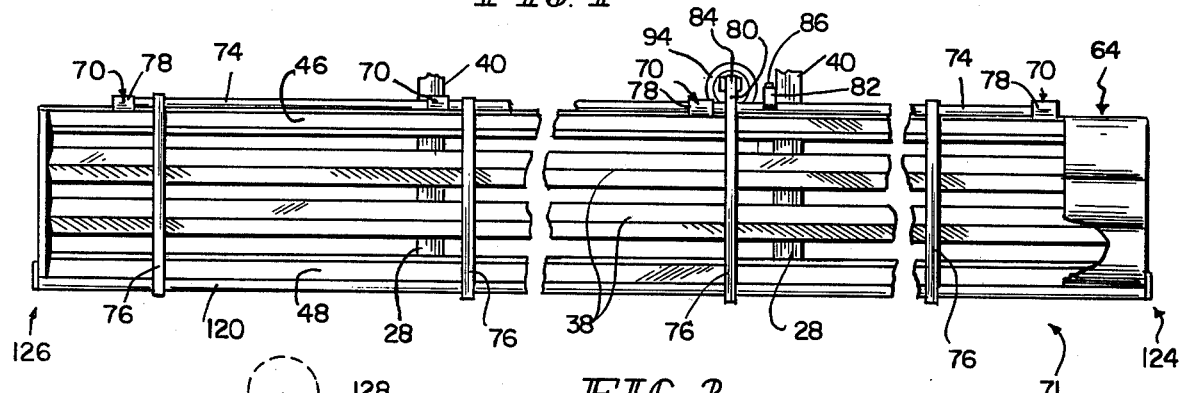
FIG. 2
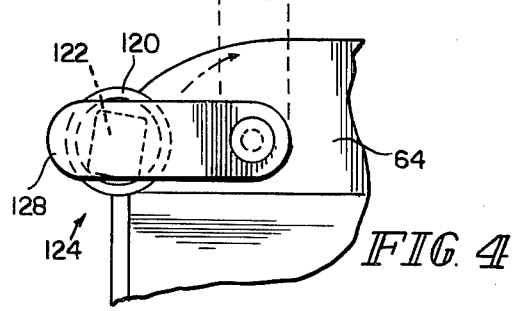
FIG. 4
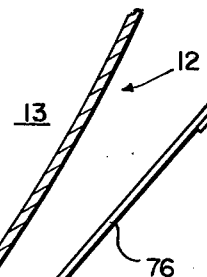
FIG. 3
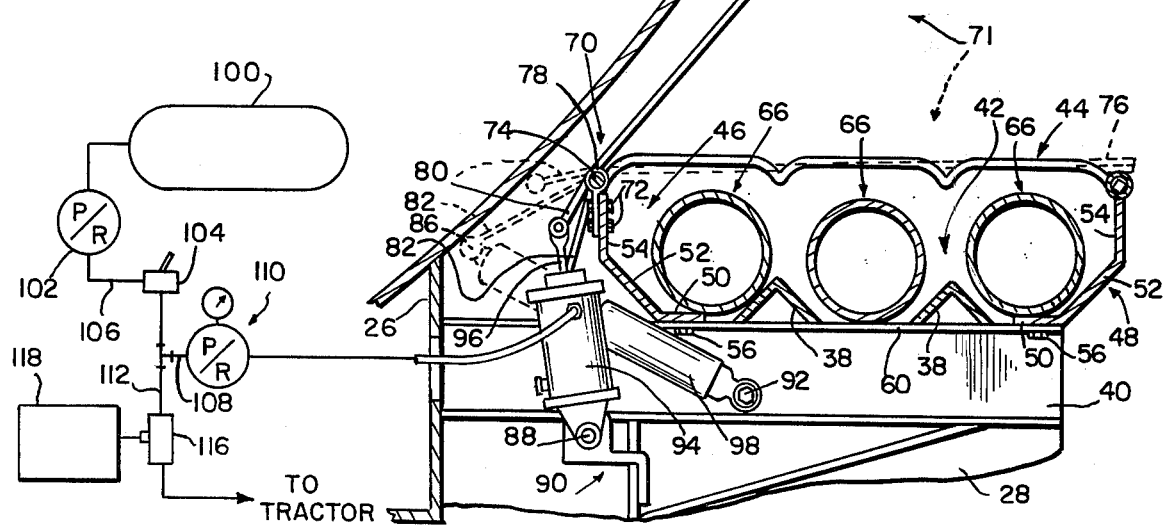

HOSE TRAY FOR LIQUID TRANSPORTER

This invention relates to fluid transport vehicles, and particularly to a fill and drain hose tray incorporating convenience and safety features for such vehicles.

Fluid transport vehicles, such as gasoline tank trucks, include elongated generally elliptical or circular cylinders which are typically divided internally into, for example, four or five separate tank portions. Typically, fill and drain fittings providing access to fill and drain each tank on such a transport are provided in a fill and drain fitting access area beneath the tank cylinder, on the commonly used "bottom loading" or "bottom filling" transports. The fittings are adapted to be connected by flexible hose to, for example, a refiner's bulk storage tank or a service station storage tank to transfer gasoline into the transport from the bulk tank or from the transport into the service station storage tank.

Many fluid transport vehicles are equipped with interlocks between the fill fittings of bottom loading transports and the brake systems of the transports so that such vehicles cannot be moved while fill hoses are connected to the fill fittings thereof.

Certain types of fluid transports also include switches actuable selectively to lock the brakes when a tank of such a transport is being emptied. Even so, such transports occasionally are inadvertently moved during a drain operation, causing drain hoses to be ruptured, or drain fittings on the hoses or fitting panels of the transport to be damaged, and resulting in considerable leakage of fluid. Frequently, such fluids are corrosive, highly flammable, and/or pollutants, and result in substantial hazzards to health and safety. Further, the lengths of fill and drain hose themselves, including their fittings, are quite expensive. In this regard, lengths of fill and drain hose occasionally are misplaced, lost in transit or stolen, resulting in substantial expense to the transport operator or owner.

Typically, prior art transports had to be equipped with straps or other tie-down means to prevent such accidental dislodgement of lengths of hose from the transport vehicle while the vehicle was in transit. Many prior art transports include hollow tubes with removable end caps, the tubes attached to the transport frames and extending longitudinally therealong, and the hose stowed in the tubes. However, there are certain disadvantages to this system. Among the disadvantages is that the hose can only be unloaded from, and loaded into, the tubes from the ends thereof. This can occasion hardship to the operator unloading and loading the hose, particularly if the transport is backed into a parked position adjacent a wall or other obstruction that renders it difficult to remove the hose rearwardly from the storage tube.

Accordingly, it is an object of the present invention to provide a fluid fill and drain hose storage tray for a fluid transport vehicle, the tray including a cover having a closed position preventing unauthorized access to the fill and drain hose stored therein, and preventing accidental dislodgement of the lengths of fill and drain hose from the tray when the fluid transport vehicle is in motion.

Another object of the present invention is to provide a safety apparatus for such a vehicle, wherein opening of the cover of the hose tray actuates the vehicle brake to prevent movement of the vehicle until the cover is again closed. Typically, the cover will only be closed when all of the lengths of fill and drain hose are replaced therein.

According to the instant invention, a tray for storing fluid fill and drain hose for a fluid transport vehicle is provided. The vehicle includes a tank for containing a fluid for transport and an orifice for draining the fluid from the tank. The tray is mounted on the vehicle and includes a cover having a first, closed position covering the tray to prevent access to the contents thereof, and a second, open position permitting access to the tray contents, and means for permitting movement of the cover between the first and second positions to provide access to the tray.

According to an illustrative embodiment of the invention, the movement permitting means includes means for moving the cover and switch means actuable selectively to actuate the moving means to move the cover between the first and second positions. The vehicle includes brake means actuable to prevent movement of the vehicle, the tray further comprising means for coupling the switch means to the brake means, actuation of the switch means for movement of the cover to the second position causing actuation of the brake means to prevent movement of the vehicle. The brake means remain actuated until the switch means is actuated for movement of the cover to the first position, such that the vehicle can only be moved when the cover of the tray is closed.

Additionally, according to an illustrative embodiment, the means for moving the cover between the first and second positions includes a fluid cylinder and a ram reciprocably in the cylinder, the switch means selectively actuable to cause fluid to flow into the cylinder to move the cover to the second position.

Further according to an illustrative embodiment, the tray is an elongated, shallow, box-like structure having means providing a perforate bottom to permit drainage of the tray, two longitudinally extending sides and two ends, and the cover covering the open top side of the tray comprises a plurality of spaced-apart transverse members, the cover further comprising hinge means for connecting the transverse members to one of the longitudinal sides of the tray.

The invention may best be understood by referring to the following description and accompanying drawings which illustrate the invention. In the drawings:

FIG. 1 is a side elevational view of a fluid transport vehicle incorporating the apparatus of the instant invention;

FIG. 2 is a partly fragmentary top plan view of the apparatus of the invention, taken generally along section lines 2—2 of FIG. 1;

FIG. 3 is a combined fragmentary sectional and diagrammatic view of the apparatus of the instant invention taken generally along section lines 3—3 of FIGS. 1—2;

FIG. 4 is a fragmentary end elevational view taken generally along section lines 4—4 of FIGS. 1-2.

Figure 5:
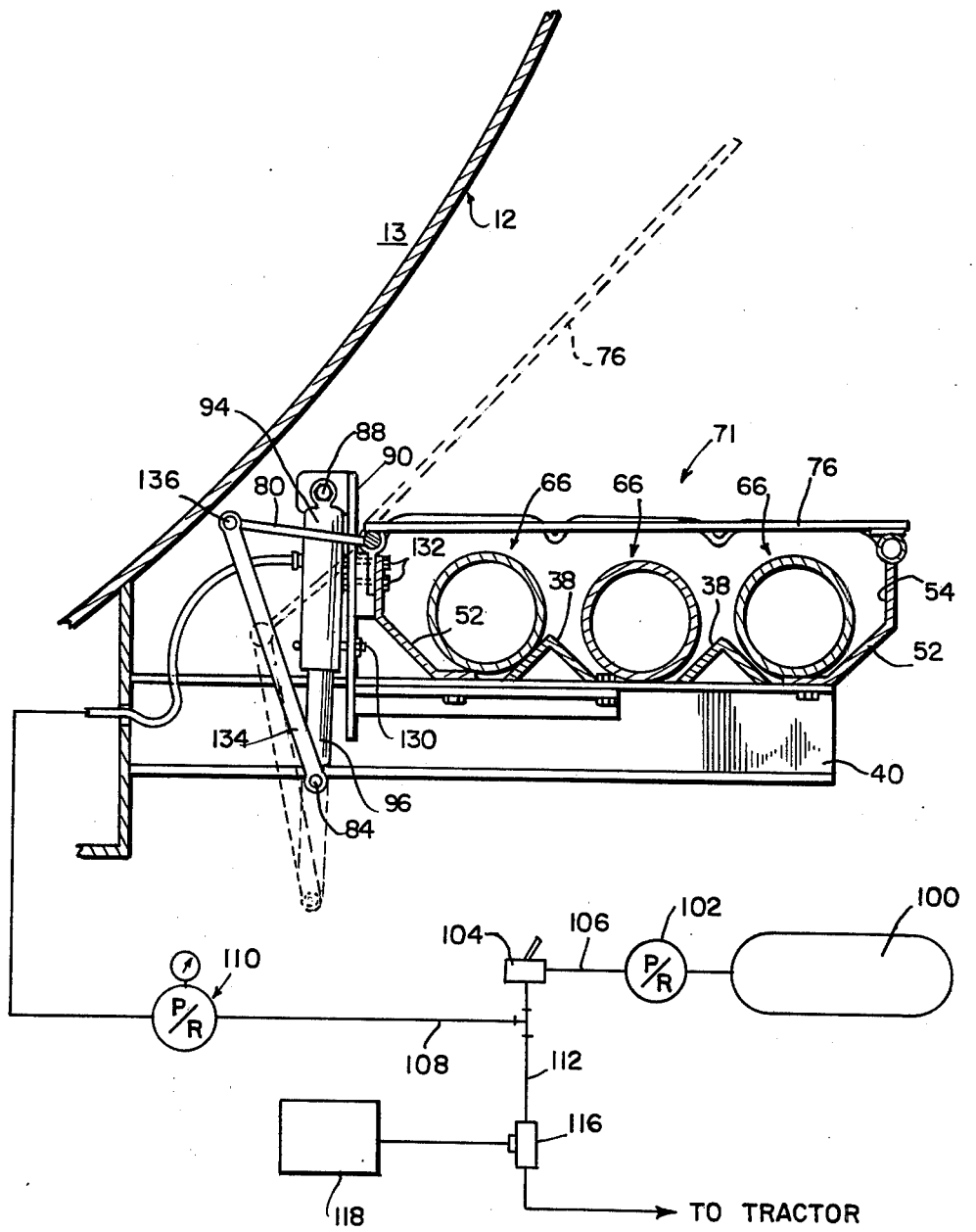
FIG. 5 is a combined fragmentary sectional and diagrammatic view of another embodiment of the apparatus of the instant invention taken along section lines 3—3 of FIGS. 1—2.

FIG. 1 illustrates a fluid transport trailer 10 adapted to be towed by a tractor (not shown). The trailer includes a circular- or elliptical cross section shell 12 which is divided internally into one or more (and generally four or five) separate fluid storage tanks 13 by bulkheads 15. The tanks are accessible from outside the trailer 10 for filling and draining through a tank access area or panel 14. The trailer 10 is of the type commonly known as a bottom-loading type in which fluids flow through inlet, or fill, fittings 16 situated on the panel 14 beneath the shell 12. Tanks 13 are filled from a tank such as a refiner's bulk storage tank (not shown) for gasoline or other petroleum products.

A plurality of hand-operated valves 18 are situated adjacent the fill fittings 16 to direct fluids entering through fittings 16 into one or more selected tanks 13 within shell 12. The panel 14 also includes a plurality of drain fittings 20, one connected by a drain line (not shown) to the bottom of each of the tanks 13 within shell 12. Drain fittings 20 are also controlled by valves 18. The top of shell 12 includes a catwalk 22 along which are located a plurality of selectively operable vent openings (not shown), one for each of the tanks 13 in shell 12. Governmental regulations mandate that in many large metropolitan areas, when one of the tanks 13 within shell 12 is being drained, a vapor recovery system must be in operation. To implement such a system, one or more lengths of fill and drain hose must be attached between the vent opening of the tank 13 being emptied, and the nozzle through which the tank 13 is being emptied, or alternatively connected to the storage tank into which the tank 13 in shell 12 is being emptied. Such additional hoses between the nozzle or storage tank and the vent openings in tanks 13 permit recirculation of the fumes from the storage tank in which the tank 13 is being emptied and the tank 13 itself.

The shell 12 is supported upon a plurality of longitudinal frame members or rails 26 and transverse frame members or rails 28. Typically, there will be two longitudinal rails with transverse rails 28 extending between, and projecting beyond the longitudinal rails 26 on both sides of the trailer 10. The trailer 10 further includes a conventional undercarriage or running gear 30 to which are connected the longitudinal rails 26. The undercarriage 30 includes the trailer 10 wheels 32 with pneumatic tires mounted thereon, leaf spring assemblies (not shown), axles (not shown), etc. Typically, the wheels 32 will be shrouded by fenders 34 which are supported upon projections of transverse frame rails 28 beyond longitudinal frame rails 26. A telescopic landing gear 35 including shoes 37 is mounted on longitudinal frame rails 26 near the front end of the trailer 10.

With particular reference now to FIGS. 2-3, a pair of metal angles, e.g., aluminum extrusions 38 are attached, e.g., by welding to the projections 40 of the transverse frame rails 28 on one side of trailer 10. Extrusions 38 are mounted with their open sides down to provide a slotted supporting bottom 42 for a fill and drain hose tray 44. Tray 44 further includes a pair of longitudinally extending sides, one 46 adjacent shell 12 and the other 48 at the outer ends of projections 40 of transverse frame rails 28. Sides 46, 48 include bottom flanges 50, upwardly and outwardly flaring side wall portions 52, and vertically extending side wall portions 54. Since transverse frame rails 28 typically are generally I-shaped in cross section, as best illustrated in FIGS. 1, 3, sides 46, 48 are attached to projections 40 by bolts 56 which extend through the bottom flanges 50 of tray sides 46, 48 and through the upper horizontal walls 60 of the I-beam projections 40. Tray 44 further includes a rear end cap 62 and a front end cap 64. The front end cap 64 extends over the forward ends of the lengths 66 of fill and drain hose stored in the tray 44. The extension of front end cap 64 over the hose 66 prevents exposure of the open forward ends of the hose to precipitation as the vehicle 10 is in transit. This minimizes the occurrence of moisture inside the hose 66. Further, cap 64 has a shrouding effect preventing air from lifting the open forward ends of the hose 66 while the vehicle 10 is in transit.

A plurality of hinge members 70 are attached by bolts 72 to side 46 of tray 44 adjacent shell 12. The hinge members 70 are spaced apart longitudinally of shell 12 pivotally to receive a circular cross section tubular hinge pin 74. The cover 71 of tray 44 includes a plurality of transversely extending flat stock members 76 which are attached, e.g., by welding, to hinge pin 74. In the illustrative embodiment, one member 76 is provided adjacent each of the hinge member 70 rings 78. This prevents excessive longitudinal movement of the hinge pin 74 with respect to the hinge rings 78. A generally centrally located one of members 76 includes a projection or ear 80 which extends beyond side 46 of tray 44 into the space between the tray 44 and shell 12. An additional projection or ear 82 is provided adjacent ear 80, the ear 82 being welded or otherwise secured to the hinge pin 74. Pivotal attachment eyes 84, 86 are provided on the inner ends of ears 80, 82, respectively, adjacent shell 12. A pivotal attachment point 88 (FIG. 3) is provided on a bracket 90 which extends rearwardly from one of projections 40 adjacent ear 80. A pivotal attachment point 92 is provided on the projection 40 adjacent ear 82. An air cylinder 94 is pivotally attached to point 88 on bracket 90. The piston or ram 96 of air cylinder 94 is pivotally attached to the eye 84 on ear 80. A damper 98, which in the illustrated embodiment is an ordinary automobile shock absorber, is attached pivotally to eye 86 on ear 82 and to attachment point 92.

The pneumatic system for the hose tray 44 and cover 71 includes an air tank 100 to which is attached a pressure regulator 102. An air toggle switch 104 is mounted on trailer 10 beneath hose tray 44 adjacent access panel 14. A suitable air line 106 is connected between the pressure regulator 102 and switch 104. An air line 108 is connected between switch 104 and an air pressure regulator and gauge 110. The output of regulator 110 is connected to air cylinder 94. An air line 112 is connected between a T fitting 114 in line 108 and a shuttle valve 116 which is connected to actuate the brake mechanisms 118 associated with wheels 32 of trailer 10. Movement of air toggle switch 104 from a first position, illustrated in FIG. 4, to a second position connects air tank 100 through switch 104 and regulators 102, 110 to air cylinder 94, and through air line 112 to the shuttle valve 116 associated with the vehicle brake mechanism 118. This air locks the brake mechanism 118 on, preventing movement of trailer 10. This air also urges the piston 96 downwardly in air cylinder 94 to the position illustrated in solid lines in FIG. 3, and the damper 98 to the position illustrated in solid lines in FIG. 3 to pivot hinge pin 74 counterclockwise about its axis and raise the cover 71 of tray 44 to the position illustrated in solid lines in FIG. 3. This position of cover 71 permits easy access to the lengths 66 of fill and drain hose in tray 44. Cover 71 remains in the open position as long as air switch 104 is in its second position. The vehicle brake mechanism 118 remains locked while cover 71 is in its open position.

When the fill or drain operation in connection with which the lengths 66 of the hose are being used is completed, the lengths 66 of the hose are reloaded into tray 44 and switch 104 is returned to its first position. With switch 104 in this position, air lines 108, 112 and brake mechanism 118 and air cylinder 94 are vented to atmosphere, permitting cover 71 to return to its closed position, illustrated in broken lines in FIG. 4, under the control of damper 98, which returns to its cover-closing orientation, illustrated in broken lines in FIG. 4. Movement of the cover 71 to this position releases the vehicle brake mechanism 118 such that trailer 10 can be moved, and prevents hoses 66 from being accidentally or intentionally removed from tray 44.

As best illustrated in FIG. 2-4, a stick tube 120 is attached to the top side wall portion 54 of tray 44 side 48. Tube 120 is hollow and is of sufficient size to re-receive a measuring stick 122 at each of its open forward and rearward ends 124, 126, respectively. A cover flap 128 is pivotally attached to the outside of each of end caps 62, 64, the flaps being pivotally movable from their downward positions in which they close the ends 124, 126 of tube 120 to prevent the loss of measuring sticks 122, to their positions, illustrated in broken lines in FIG. 4, in which they permit removal of sticks 122 to measure the depth of fluid in a tank and replacement of the sticks in tube 120.

In the embodiment of the invention illustrated in FIG. 5, those elements numbered identically with the elements of the embodiment of FIGS. 1-4 perform the same or similar functions. In the embodiment of FIG. 5, a pneumatic shock absorber 94 is utilized in place of the air cylinder 94 of the embodiment of FIGS. 1-4. The air shock absorber 94 of FIG. 5 also takes the place of the damper 98 of FIGS. 1-4. The air shock absorber 94 of FIG. 5 is pivotally attached at its upper end to a point 88 on a bracket 90 which is bolted to side 46 of tray 44. The air shock absorber 94 is also attached to bracket 90 by a U-bolt 130 and nuts 132 which are connected to bracket 90 and air shock absorber 94 intermediate their upper and lower ends. The piston or ram 96 of air shock absorber 94 is pivotally attached to a pivotal attachment point 84 at one end of a connecting rod 134. A pivotal connecting point 136 at the other end of connecting rod 134 provides pivotal attachment of the connecting rod 134 to an ear 80, which, as in the preceding embodiment, is welded or otherwise secured to the hinge pin 74. Movement of the air toggle switch 104 of this embodiment from a first position, illustrated in FIG. 5, to a second position, connects air tank 100 through switch 104 and regulators 102, 110 to air shock absorber 94, and through air line 112 to the shuttle valve 116 associated with the vehicle brake mechanism 118. This air urges the piston 96 downwardly in the air shock absorber 94 to the position illustrated in broken lines in FIG. 5, pulling the connecting rod 134 downward and pivoting the hinge pin 74 to raise the cover 71, permitting easy access to the lengths 66 of fill and drain hose in tray 44. As before, cover 71 remains in the open position as long as air switch 104 is in its second position. The vehicle brake mechanism 118 remains locked while cover 71 is in this open position.

When switch 104 is moved to its tray 44 closing position, the air in air shock absorber 94 holding ram 96 downwardly bleeds back through switch 104 to permit the ram 96 gradually to move upwardly in air shock absorber 94, permitting the cover 71 gradually to close. Movement of cover 71 to this position releases the vehicle brake mechanism 118 such that trailer 10 can be moved and prevents hoses 66 from being removed from tray 44.

What is claimed is:

1. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, means for moving the cover between the first and second positions, and switch means actuable selectively to actuate the moving means to move the cover between the first and second positions, the tray comprising an elongated, shallow structure having two longitudinally extending sides and two ends and an open top side, and the cover covering the open top side of the tray, and further comprising hinge means for connecting the cover to one of said ends or said longitudinal sides.

2. The apparatus of claim 1 wherein the means for moving the cover between the first and second positions includes a fluid cylinder and a ram reciprocable in the cylinder.

3. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, means for moving the cover between the first and second positions, and switch means actuable selectively to actuate the moving means to move the cover between the first and second positions, the vehicle further comprising brake means actuable to prevent movement of the vehicle, the tray further comprising means for coupling the switch means to the brake means, actuation of the switch means for movement of the cover to the second position causing actuation of the brake means to prevent movement of the vehicle, the brake means remaining actuated until the switch means is actuated for movement of the cover to the first position.

4. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, means for moving the cover between the first and second positions, and switch means actuable selectively to actuate the moving means to move the cover between the first and second positions, the tray including an elongated, shallow structure having two longitudinally extending sides and two ends, and the cover covering the open top side of the tray comprising a plurality of transverse members, and further comprising hinge means for connecting the transverse members to one of the longitudinal sides.

5. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, and means actuable to permit movement of the cover between the first and second positions, the tray including an elongated shallow portion having two longitudinal sides and two opposite ends extending between the sides, the cover covering the top side of the shallow portion, and means for hingedly attaching the cover to one of the longitudinal sides, the means actuable to permit movement of the cover between the first and second positions including a switch, and means responsive to the switch selectively to move the cover between the first and second positions.

6. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, and means actuable to permit movement of the cover between the first and second positions, the tray including an elongated shallow portion having two longitudinal sides and two opposite ends extending between the sides, the cover covering the top side of the shallow portion, and means for hingedly attaching the cover to one of the longitudinal sides, the means actuable to permit movement of the cover including switch means, and means for moving the cover between the first and second positions, the switch means being actuable selectively to actuate the moving means.

7. The apparatus of claim 6 wherein the means for moving the cover between the first and second positions includes a fluid cylinder and a ram reciprocable in the cylinder.

8. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, switch means actuable to permit movement of the cover between the first and second positions, means for moving the cover between the first and second means, the switch means being actuable selectively to actuate the moving means, the vehicle further comprising brake means actuable to prevent movement of the vehicle, the tray further comprising means for coupling the switch means to the brake means, actuation of the switch means for movement of the cover to the second position causing actuation of the brake means to prevent movement of the vehicle, the brake means remaining actuated until the switch means is actuated for movement of the cover to the first position.

9. A tray for storing fluid fill and drain hose for a fluid transport vehicle, the vehicle including a tank for containing a fluid for transport, and an orifice for draining the fluid from the tank, the tray being attached to the vehicle and including a cover having a first closed position covering the tray to prevent access to the contents thereof and a second open position permitting access to the tray contents, switch means actuable to permit movement of the cover between the first and second positions, means for moving the cover between the first and second positions, the switch means being actuable selectively to actuate the moving means, the tray including an elongated, shallow structure having two longitudinally extending sides and two ends, and the cover covering the open top side of the tray comprising a plurality of transverse members and hinge means for connecting the transverse members to one of the longitudinal sides.

* * * * *